United States Patent [19]

Suzuki

[11] Patent Number: 4,713,836

[45] Date of Patent: Dec. 15, 1987

[54] TELEPHONE SET STRUCTURE HAVING A MEMBER CAPABLE OF BEING INSERTED IN INVERTIBLE POSITION

[75] Inventor: Takeshi Suzuki, Tokyo, Japan

[73] Assignee: NEC Corporation, Japan

[21] Appl. No.: 752,142

[22] Filed: Jul. 3, 1985

[30] Foreign Application Priority Data

Jul. 6, 1984 [JP] Japan ............................ 59-101428[U]
Sep. 17, 1984 [JP] Japan ............................ 59-140609[U]

[51] Int. Cl.⁴ ........................ H04M 1/23; H04Q 7/00
[52] U.S. Cl. ...................................... 379/58; 379/59; 379/428
[58] Field of Search ................ 179/2 E, 2 EA, 2 EB, 179/100 R, 100 C, 100 D, 147, 179, 146 E; 455/89, 90, 346, 349, 351; 379/58–59, 61–63, 110, 419, 428, 432–440

[56] References Cited

U.S. PATENT DOCUMENTS

| | | | |
|---|---|---|---|
| 2,152,494 | 3/1939 | Obergfell | 379/369 |
| 2,560,320 | 7/1951 | Winkler | 455/90 |
| 2,946,857 | 7/1960 | Benjamin | 379/369 |
| 2,984,740 | 5/1961 | Madland et al. | 455/89 |
| 3,581,019 | 5/1971 | Ryan | 379/63 |
| 3,608,665 | 9/1971 | Drisi | 379/89 X |
| 4,006,311 | 2/1977 | Carlsson | 381/24 X |
| 4,056,696 | 11/1977 | Meyerle et al. | 379/419 |
| 4,122,304 | 10/1978 | Mallian, II | 455/90 X |
| 4,368,359 | 1/1983 | Genaro et al. | 379/93 |
| 4,577,068 | 3/1986 | Kelly et al. | 379/428 |

FOREIGN PATENT DOCUMENTS

| | | | |
|---|---|---|---|
| 0137382 | 4/1985 | European Pat. Off. | 379/433 |
| 1223889 | 9/1966 | Fed. Rep. of Germany | 379/428 |
| 2277475 | 1/1976 | France | 379/435 |
| 2415394 | 8/1979 | France | 379/388 |

OTHER PUBLICATIONS

Kombayash et al., "Detachable Mobile Radio Units for the 800 MHZ Land Mobile Radio System", *IEEE Vehicular Technology Conference*, 34th, 1984, pp. 6–11.

Primary Examiner—Thomas W. Brown
Assistant Examiner—Mark E. Ham
Attorney, Agent, or Firm—Laff, Whitesel, Conte & Saret

[57] ABSTRACT

A telephone set structure includes a handset unit and a base unit. The base unit includes a casing, a mounting member provided with a manually controlled section made up of a power switch and a volume control switch on one of its opposite side faces. A non-manually controlled section, having a speaker grill, is on the other side face. The mounting member is inserted into the casing with the opposite side faces invertibly positioned, to accommodate either left-hand or right-hand drives. A handset coupling section fixes the handset in position and covers the casing in which the mounting member is received.

12 Claims, 9 Drawing Figures

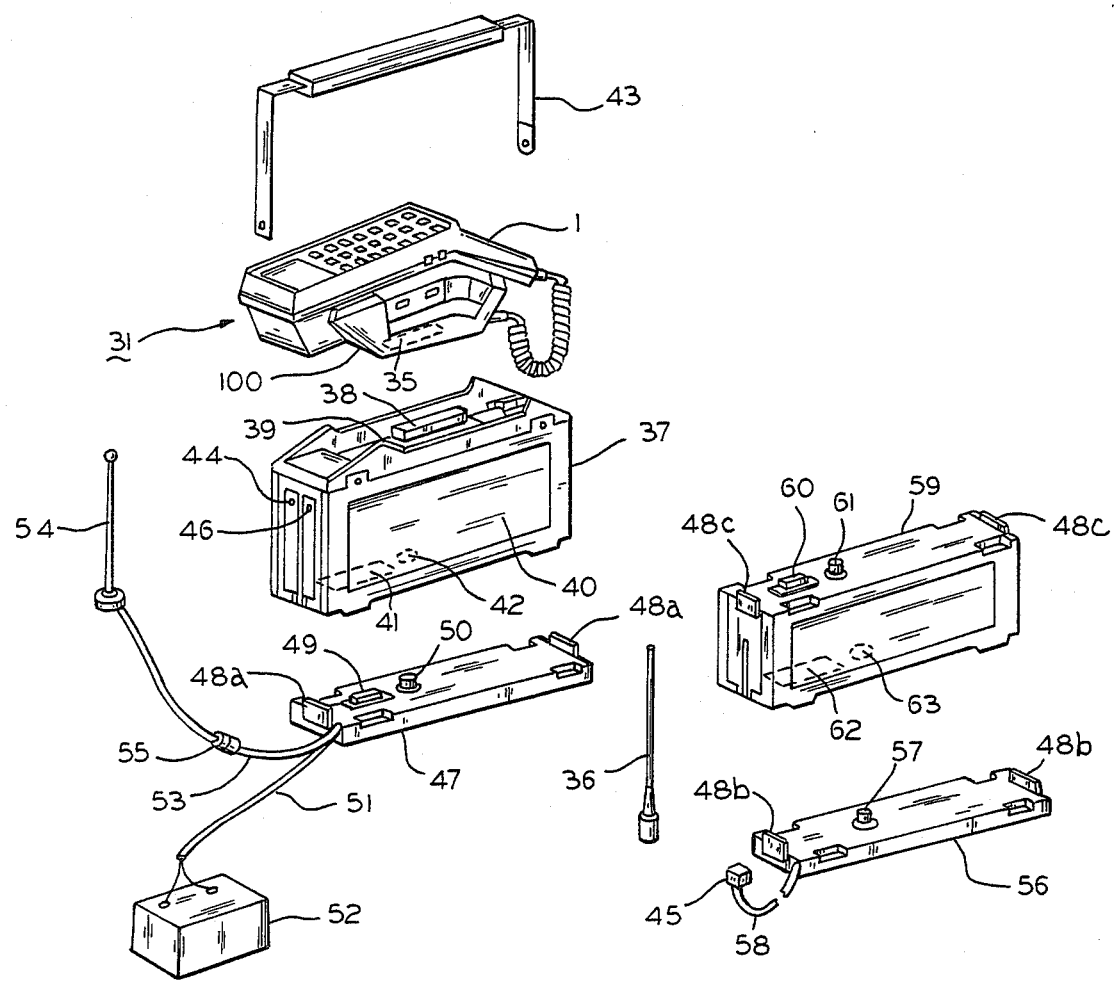
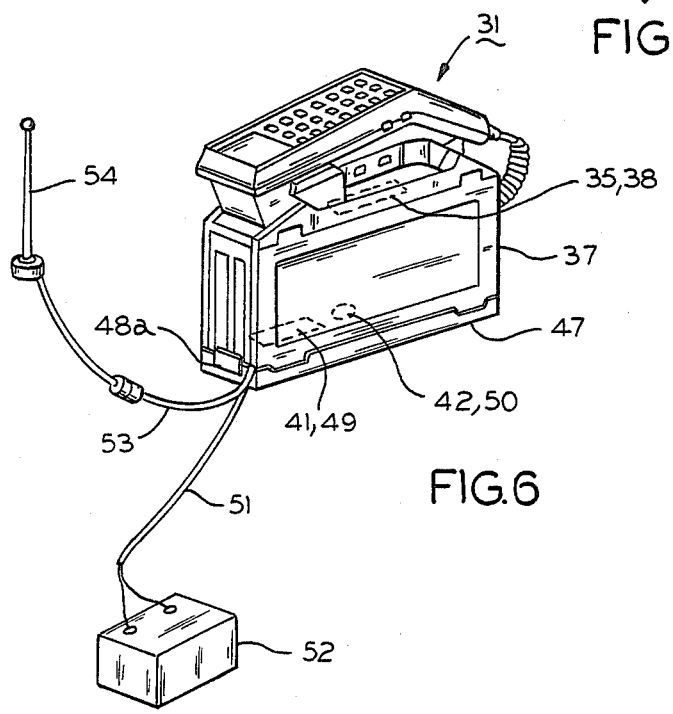
FIG.5
FIG.6

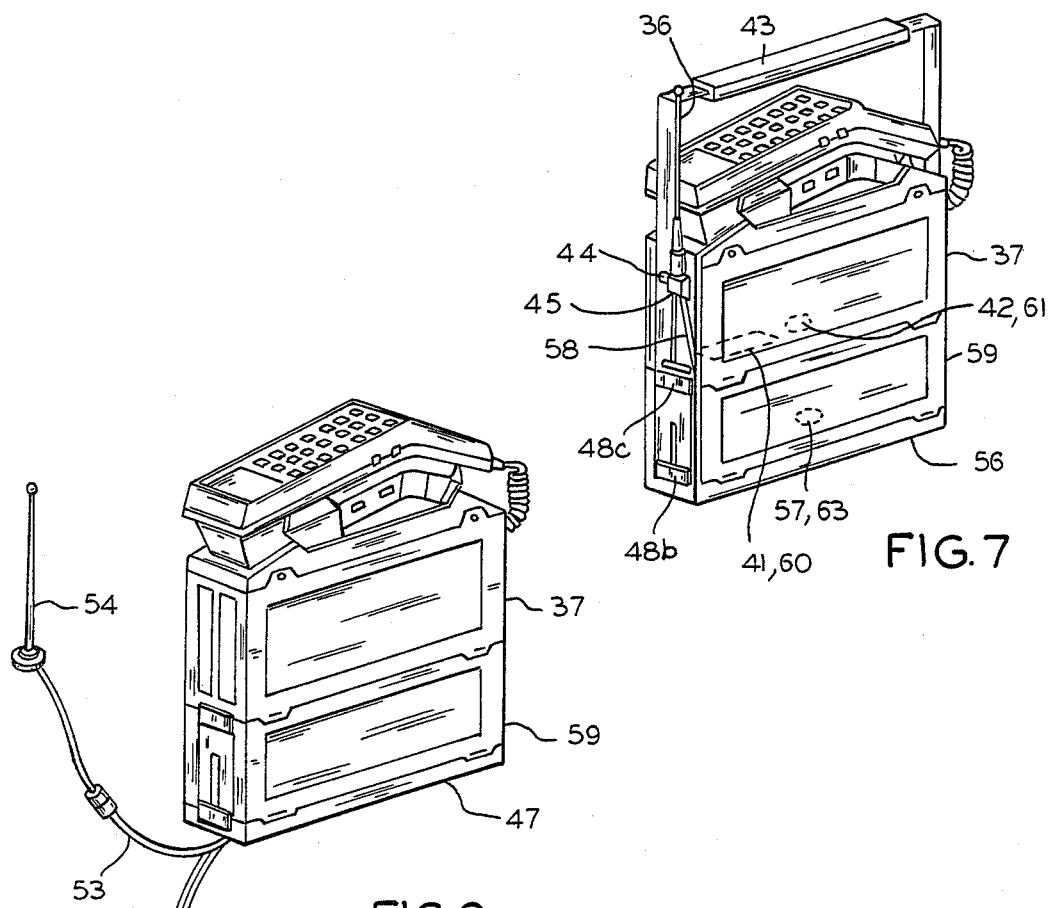
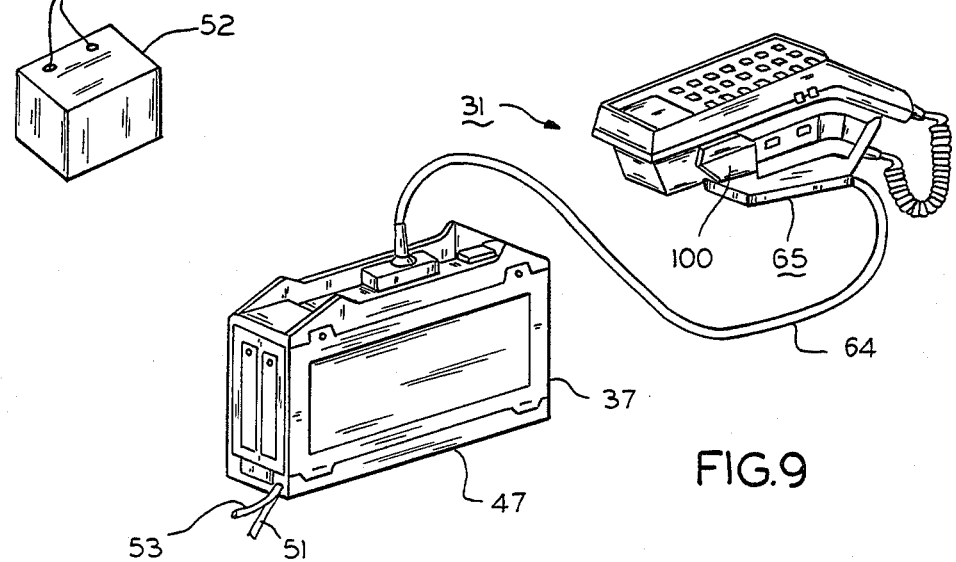

TELEPHONE SET STRUCTURE HAVING A MEMBER CAPABLE OF BEING INSERTED IN INVERTIBLE POSITION

BACKGROUND OF THE INVENTION

The present invention relates to the structure of a telephone set and, more particularly, to the structure of a radiotelephone which is installed in a vehicle cabin or like confinement.

A telephone for use in a vehicle is usually made up of a handset unit and a base unit which is physically separate from the handset unit. The base unit is adapted to support the handset unit and is provided with a volume control knob, a power switch, and other switches on one of the opposite side faces thereof. A loudspeaker is on the other side face of the base unit. This kind of telephone for a vehicle is generally positioned at the left of the driver's seat if the driver's seat is monted at the right-hand side of the vehicle and at the right of the driver's seat if it is mounted at the left-hand side, so that only one of the opposite side faces of the base unit opposes a person who is seated in the driver's seat. Hence, arranging the manually controlled section with the volume control knob and power switch, for example, on the right face of the base unit is desirable from easy access standpoint for a vehicle of one type having a driver's seat at the right. However, this arrangement is undesirable for a vehicle of the other type having a driver's seat at the left, while arranging them on the left face of the base unit is desirable for the latter type of vehicle but is undesirable for the former type of vehicle.

Meanwhile, a current trend in the art of vehicle-mounted telephones, which has evolved from the decrease in equipment size, is toward their applications in both the inside and the outside of a vehicle cabin. However, a telephone provided with a structure which matches such a trend has not yet been realized.

SUMMARY OF THE INVENTION

It is, therefore, an object of the present invention to provide a telephone set structure having a single hand set supporting base unit which is applicable to a vehicle with no regard to the position of a driver's seat.

It is another object of the present invention to provide a telephone set structure which includes a member with a side face having a manually controlled section and side face provided with a non-manipulable secion which may be invertible in position without substantially changing the configuration of a base unit.

It is another object of the present invention to provide a telephone set structure which may be used inside or outside of a vehicle cabin, as desired, and which is easy to switch in configuration for inside use and outside use.

A telephone set structure of the present invention comprises a handset having a transmitter and a receiver, a base for fixing the handset in place and for accommodating circuits which are electrically interconnected to the transmitter and receiver of the handset. A mounting member includes a manipulable section on one of its opposite side faces and a non-manipulable section on the other of its side face. The mounting member is constructed to be inserted into the base in such a manner that the opposite side faces may be inverted with respect to each other.

BRIEF DESCRIPTION OF THE DRAWINGS

The other objects, features and advantages of the present invention will become more apparent from the following description taken with the accompanying drawings in which:

FIG. 5 is an exploded perspective view of the telephone set, in accordance with the present invention, which is connected with a radio equipment; and FIGS. 6-9 are perspective views showing various conditions in which the telephone set, in accordance with the present invention, may be used in combination with the radio equipment.

DETAILED DESCRIPTION OF THE INVENTION

Figure 1:
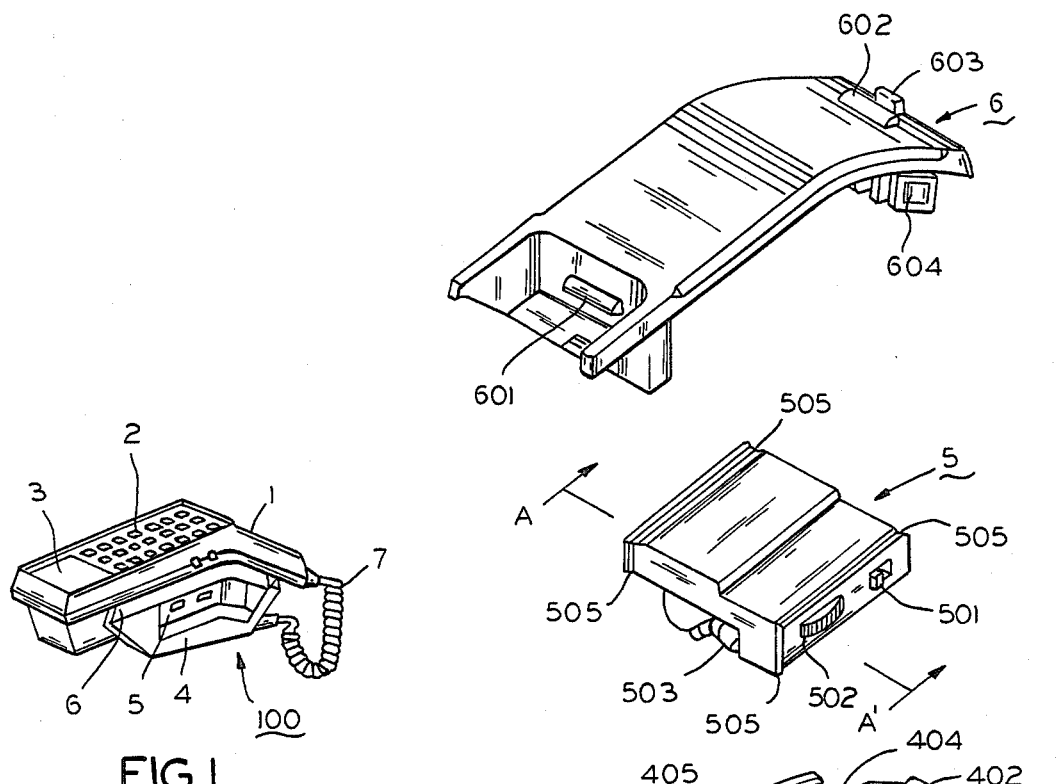
FIG. 1 is a perspective view of a telephone set to which the present invention is applied.

FIG. 1 of the drawings shows a telephone set to which the pesent invention is applied and includes a handset 1 and a base or handset support 100. The handset 1 comprises a microphone or transmitter and a receiver and is provided with dial buttons 2, a display 3, and other components.

The base 100 includes a coupling section 6 for fixing the handset 1 in place, a mounting member 5 which mounts thereon a power switch, a loudspeaker and other components. A casing 4 accommodates the mounting member 5 and a circuit board on which necessary circuits are loaded. The mounting member 5, as will be described later in detail, has a manually controlled section arranged on one side face thereof and is provided with a volume control knob, a power switch and other components. A non-manipulable seciton is arranged on the other side face and is provided with a speaker grill and other components. The member 5 is engageable with the casing 4 in such a manner that the opposite side faces may be invertible in position to replace each other. The handset coupling section 6 is fastenend to the casing 4 by screws or like fastening means and functions to fix the handset 1 in place. Electronic circuits built in the handset 1 are electrically connected by a coiled cord 7 to those circuits which are installed in the casing 4.

Figure 2:
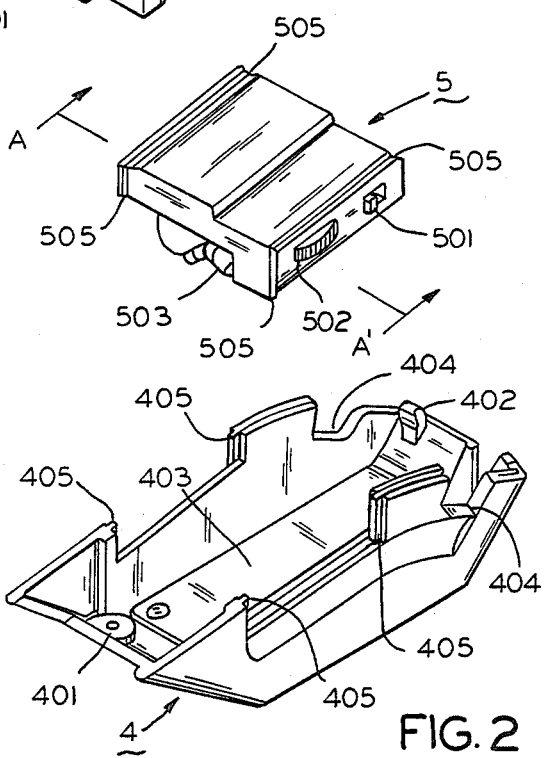
FIG. 2 is an exploded perspective view of part of the telephone set shown in FIG. 1.

Referring to FIG. 2, the handset coupling secion 6 includes lugs 601 and 602 which are adapted to lock the handset 1 in position. The lug 602 is operaively connected with a push-button 604 such that it unlocks the handset 1 when the push-button 604 is depressed. Another lug 603 is spring-biased to raise the handset 1 when the latter is released from the lug 602, so that the operator may easily grasp and hold the handset 1 for communication. The coupling section 6 is locked by a projection 402 extending from the casing 4 and is fixed to the casing 4 by means of a screw (not shown) which is driven into a threaded hole 401.

Figure 3:
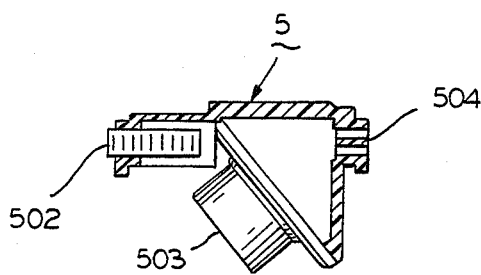
FIG. 3 is a section along line A—A' of FIG. 2.

The mounting member 5 is provided with a power switch 501 and a volume control knob 502 on one side face. A speaker grill 504 (see FIG. 3) is on the other side face. As shown in FIG. 3, a loudspeaker 503 is mounted on the member 5 in an inclined position so as to minimize the dead space. Returning to FIG. 2, vertical recesses 505 extend respectively at the four conrners of the mounting member 5 to receive four lugs 405 on the casing 4. The recesses 505 share the same configuration and dimensions, and as do the projections 405. Further, the opposite side faces of the mounting member 5 share the same length. With such a structure, the member 5 may be inserted into the casing 4 with the opposite side faces held in an invertible positional relationship. That is, the position of the manipulable section inclusive of the power switch 501 and volume control knob 502 and the position of the non-manipulable section inclusive of the speaker grill 504 can be interchanged merely by inverting the lateral orientation of the mounting member 5 relative to the casing 4.

The casing 4 has a capacity which is great enough to accommodate not only the mounting member 5 but also a circuit board 403 which is loaded with electronic circuits (not shown). The casing 4 is notched to have a pair of recesses 404 for receiving the push-buttons 604 of the coupling section 6.

Figure 4:
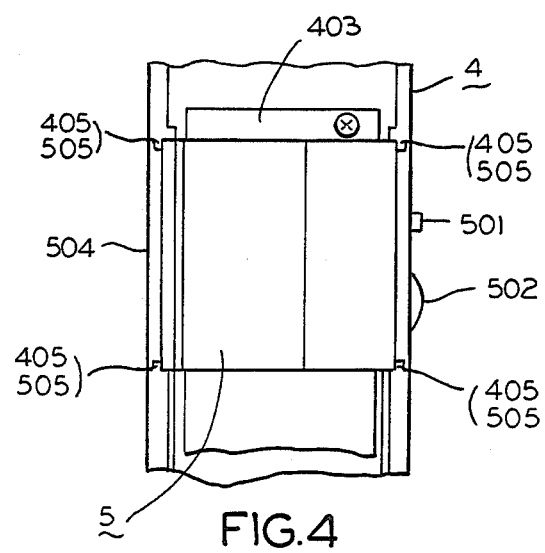
FIG. 4 is a plan view of a mounting member which is engaged with a casing of a base.

As shown in FIG. 4, the mounting member 5 is provided with a symmetrical configuration with respect to the casing 4. The four interengaging portions (405, 405) are identical with each other; therefore, there is no problem inverting the member 5 in the right-and-left directions. It follows that the telephone set shown and described is readily applicable to a vehicle regardless of the position of the driver's seat, that is, merely by inverting mounting member 5 to match it to a particular position of the driver's seat. The manually controlled section, inclusive of the power switch 501, may be located in a position which is easy for the main user of the telephone to reach.

How the handset 1 and base 100 may be used in practice will be described hereinafter.

Referring to FIG. 5, a telephone, generally 31, is make up of the handset 1 and the base 100 which has a connector 35 at its bottom surface for making electrical connections. A radio equipment body 37 is capable of processing signals which are transmitted and received through an antenna 36 or 54. A connector 38 is provided on one surface of body 37 for making connections with the connector 35, and for engaging protions 39 which are detachably engageable with the base 100. Positioned on the bottom 40 of the radio equipment body 37 are a connector 41 for making a connection with a power source and a connector 42 for making a connection with the antenna. A lug 44 extends from each of two opposing surfaces of the radio equipment body 37 to be engageable with a handle 43. Further a lug 46 extends from one of the surfaces of the radio equipment body 37 to engage a base portion of the antenna 36.

The radio equipment body 37 is fixed to a vehicle body or the like by means of a holder 47 which includes engaging portions 48a for removably retaining the equipment body 37, a connector 49 for making contact with the connector 41, and a connector 50 for making contact with the connector 42. The connector 49 is connected by a cable 51 to a power source 52 such as a battery adapted to power a vehicle, while the connector 50 is connected by a cable 53 and a relay connector 55 to the antenna 54 which is mounted on a vehicle body, for example.

A protector 56, which functions as will be described, is provided with engaging portions 48b which are the same in function as the engaging portions 48a, and a connector 57 for making a connection with the connector 42. A cable 58 extends from the connector 57 and carries at its end a connector (or base portion) 45 to which the antenna 36 may be connected. Inside battery unit 59 there is a battery and a battery charging circuit to serve as a portable power source. On one surface of the battery unit, or casing, 59 are engaging portions 48c which share the same funcion with the engaging portions 48a and 48b, a connector 60 for making a connection with the connector 41, and a connector 61 for making a connection with the connector 42. Provided on another surface of the battery casing 59 are connectors 62 and 63 for making connections with the connector 49 and the connector 50 (or connector 57), respectively.

The radiotelephone having the above construction and arranbgement is usable in different configurations, as will be described, depending upon desired conditions of use. When the radiotelephone is intended for use in a confinement such as a vehicle cabin, the holder 47 is utilized and is fixed to a vehicle body or the like. The power source cable 51 is connected to the battery 52 and the antenna cable 53 to the antenna 54. Specifically, the radio equipment body 37 is securely mounted to the holder 47 by the engaging portions 48a to interconnect their power source connectors and antenna connectors. Then, the base 100 of the telephone set 31 is mounted to the radio equipment body 37 through the engaging portions 39, setting up an electrical connection between the connectors 35 and 38. In this configuration, the radiotelephone may be operated in a vehicle cabin or like confinement.

To use the radiotelephone outside the confinement, such as while carrying it, the radio equipment 37 in the configuration of FIG. 6 is removed from the engaging portions 48a of the holder 47. Then, as shown in FIG. 7, the battery unit 59 is rigidly connected to the bottom of the radio equipment body 37 by means of the engaging portions 48c. This interconnects the power source connector 41 to the power source connector 60 and the antenna connector 42 to the antenna connector 61. Thereafter, the protector 56 is mounted to the bottom of the casing 59 through the engaging portions 48b, connecting the antenna connector 57 to the antenna connector 61. The handle 43 is then coupled with the lugs 4 of the radio equipment body 37, the antenna 36 is connected to the end of the cable 58, and the base portion 45 of the antenna 36 is engaged with the projection 46.

With the construction and arrangement described above, the telephone can readily be configured for use outside of a confinement or restored to a configuration for use inside of the confiement by manipulating the engaging portions as explained.

Other possible configurations of the radiotelephone in accordance with the present invention are shown in FIGS. 8 and 9. In FIG. 8, the battery unit 59 is mounted between the holder 47 and the radio equipment body 37 in order to charge the battery in the battery unit 59 while the telephone set 31 is used. In FIG. 9, the connector of the base 100 and the connector of the radio equipment body 37 are interconnected by an extension cable 64 and a holder 65 so that the telephone set 31 may be used while physically separated from the radio equipment body 37. In this case, the telephone set 31 is retained by the holder 65 and the radio equipment body 37 by the holder 47.

In summary, it will be seen that the present invention provides a telephone set structure which allows one to readily and reconfigurably use a single telephone inside and outside of a confinement such as a vehicle cabin. A portable battery unit may be charged while inside the confinement. A telephone set and a radio equipment body may be used separately from each other.

Various modifications will become possible for those skilled in the art after receiving the teachings of the present disclosure without departing from the scope thereof.

What is claimed is:

1. A telephone set comprising a handset mounted on a base, manual actuatable control modular means separately mounted to be installed in said base in either of two positions, one of said two positions exposing said manual actuatable control modular means on a right-hand side of said base and the other of said two positions exposing said manual actuatable control modular means on the left-hand side of said base, and means for mounting said base in either of two modes, one of said modes being a vehicle mount and the other of said modes being a portable mount.

2. A telephone set structure comprising:
a handset having a transmitter and a receiver;
a mounting member having a manually actuatable control section on one of its opposite side faces;
a casing having space for accommodating at least said mounting member and circuits which are electrically interconnected to said transmitter and receiver, said casing having cut-out sections along the edges of an open end thereof, said mounting member being inserted into said cut-out sections and being invertible with respect to its mounting position on said casing; and
a handset coupling section for fixing said handset in place, said handset coupling section being shaped to cover said casing to which said mounting member has been mounted.

3. A telephone set structure as claimed in claim 2, wherein the mounting member has four vertically extending and identically shaped recesses in a one-to-one correspondence at four corners thereof, said cut-out sections having lugs which mate respectively with said four recesses of the mounting member.

4. A telephone set structure as claimed in claim 2, wherein the handset coupling section comprises a first lug means for locking the handset, a second lug means for locking the handset and releasing the lock, said second lug means being interlocked with a push-button, and spring-biased third lug means for urging the handset away from the handset coupling section.

5. A telephone set structure as claimed in claim 16, wherein the manually actuatable control section comprises a power switch and a volume control knob and wherein said mounting means comprises an other section without a manually actuatable control section on the other of its side faces, said other section comprising a speaker grill.

6. A telephone set structure as claimed in claim 5, further comprising a loudspeaker which is mounted to the mounting member in an inclined position relative to the speaker grill.

7. A telephone set structure as claimed in claim 2, further comprising means including a radio equipment body having radio equipment operatively associated with the transmitter and receiver of the handset, at least one engaging portion, and connectors, connecting means for connecting said radio equipment body to the base, and holding means having at least an engaging portion and connectors for making a connection which corresponds, respectively, to the engaging portion and the connectors of the radio equipment body.

8. A telephone set structure as claimed in claim 7, wherein the connecting means comprises engaging portions and connectors which are provided on the handset coupling section and on the radio equipment body to enable the handset coupling section and the radio equipment body to be detachably connected to each other.

9. A telephone set structure as claimed in claim 7, wherein the connecting means comprises a cable.

10. A telephone set structure as claimed in claim 7, wherein the holding means comprises a holder which is fixedly mounted on a vehicle body and is connected to an antenna and a power source.

11. A telephone set structure as claimed in claim 7, wherein the radio equipment body comprises engaging means for making a connection to a handle for carrying the telephone set, the holding means comprising a protector to which a power source unit and an antenna are connected.

12. A telephone set structure as claimed in claim 11, wherein said power source unit comprises a chargeable battery and a charging circuit for charging said battery, the protector comprising a plug and a cable for connecting said charging circuit to an external power source.

* * * * *